United States Patent
Takahata

(10) Patent No.: US 9,499,877 B2
(45) Date of Patent: Nov. 22, 2016

(54) METHOD FOR PRODUCING HIGH-PURITY CALCIUM

(71) Applicant: JX Nippon Mining & Metals Corporation, Tokyo (JP)

(72) Inventor: Masahiro Takahata, Ibaraki (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 288 days.

(21) Appl. No.: 14/353,780

(22) PCT Filed: Nov. 13, 2012

(86) PCT No.: PCT/JP2012/079320
§ 371 (c)(1),
(2) Date: Apr. 24, 2014

(87) PCT Pub. No.: WO2013/084672
PCT Pub. Date: Jun. 13, 2013

(65) Prior Publication Data
US 2014/0301890 A1    Oct. 9, 2014

(30) Foreign Application Priority Data
Dec. 7, 2011 (JP) .................................. 2011-267536

(51) Int. Cl.
| | | |
|---|---|---|
| C22B 9/02 | (2006.01) | |
| C22B 9/04 | (2006.01) | |
| C22B 26/20 | (2006.01) | |
| C22C 24/00 | (2006.01) | |
| B22F 9/04 | (2006.01) | |

(52) U.S. Cl.
CPC . *C22B 9/02* (2013.01); *B22F 9/04* (2013.01); *C22B 9/04* (2013.01); *C22B 26/20* (2013.01); *C22C 24/00* (2013.01); *Y02P 10/234* (2015.11)

(58) Field of Classification Search
CPC ....................................................... C22B 9/02
See application file for complete search history.

(56) References Cited

U.S. PATENT DOCUMENTS

| | | |
|---|---|---|
| 5,582,630 A | 12/1996 | Lam et al. |
| 5,698,158 A | 12/1997 | Lam et al. |
| 7,753,987 B2 | 7/2010 | Du et al. |

FOREIGN PATENT DOCUMENTS

| | | |
|---|---|---|
| CN | 1202529 A | 12/1998 |
| CN | 101225477 A | 7/2008 |
| CN | 101386919 A | 3/2009 |
| JP | S42-4122 B1 | 2/1967 |
| JP | S57-57849 A | 4/1982 |
| JP | 58-141349 A | 8/1983 |
| JP | 63-011628 A | 1/1988 |
| JP | 07-076739 A | 3/1995 |
| JP | 9-256083 A | 9/1997 |
| JP | 2009-287045 A | 12/2009 |
| RU | 2205241 C1 | 5/2003 |
| WO | 2009/008121 A1 | 1/2009 |

*Primary Examiner* — Jessee Roe
*Assistant Examiner* — Christopher Kessler
(74) *Attorney, Agent, or Firm* — Howson & Howson, LLP

(57) ABSTRACT

The present invention provides a method for producing high-purity calcium, the method being characterized by the following: performing first sublimation purification by introducing calcium starting material having a purity, excluding the gas components, of 4N or less into a crucible of a sublimation vessel, subjecting the starting material to sublimation by heating at 750° C. to 800° C., and causing the product to deposit (evaporate) onto the inside walls of the sublimation vessel; and then, once the calcium that has been subjected to first sublimation purification is recovered, performing second sublimation purification by introducing the recovered calcium again to the crucible to the sublimation vessel, heating the recovered calcium at 750° C. to 800° C., and causing the product to similarly deposit (evaporate) on the inside walls of the sublimation vessel thereby recovering calcium having a purity of 4N5 or higher It is an object of the present invention to provide a technology with which calcium that has been brought to a high-purity can be obtained with stability to be used for the production of high-purity lanthanum, as well as to be used as a reducing agent for other rare earth elements, a desulfurizing or deoxidizing agent for metals, or a getter for high-vacuum pumps.

10 Claims, 1 Drawing Sheet

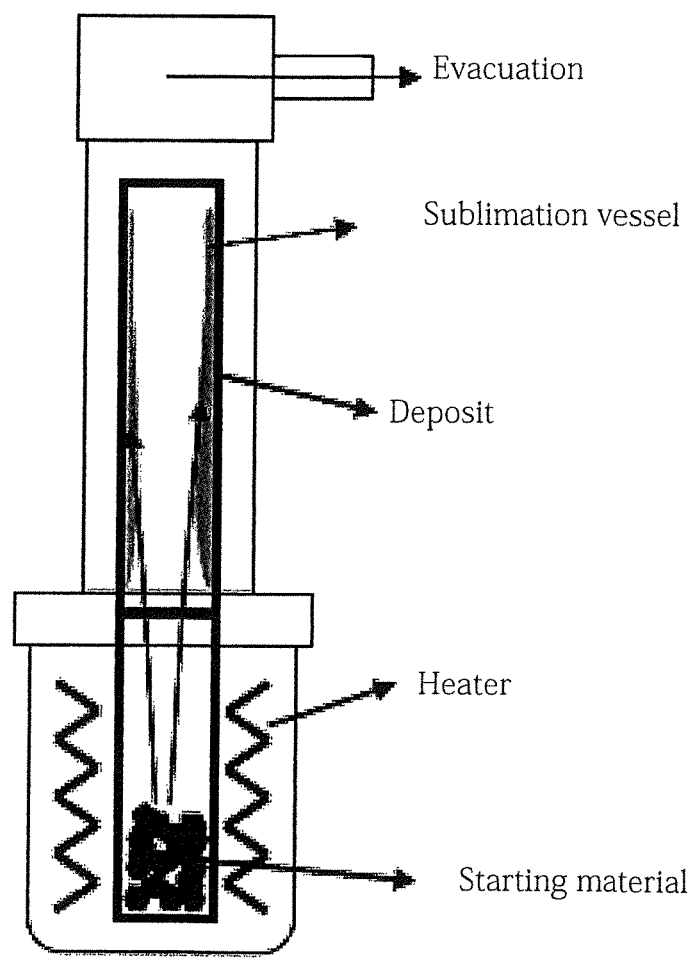

METHOD FOR PRODUCING HIGH-PURITY CALCIUM

BACKGROUND

The present invention relates to a method for producing high-purity calcium (Ca) by sublimation purification.

Calcium (Ca) is an alkaline earth metal having an atomic number of 20 and an atomic weight of 40.08 and is broadly distributed as a silicate, carbonate, sulfate, fluoride, or phosphate.

Calcium can be purified up to purity of 99.9% by vacuum distillation of calcium having a purity of 94% to 98% prepared by molten salt electrolysis of a material substantially composed of calcium chloride.

Purified calcium is a silvery-white soft metal and has a cubic close-packed structure at ordinary temperature, a hexagonal close-packed structure at 250° C. or more, and a body-centered cubic structure at 450° C. or more. Calcium has a melting point of 839° C., a boiling point of 1480° C., and a density of 1.55 g/cm$^3$ (20° C.) and directly binds to oxygen and halogens at ordinary temperature and also reacts with hydrogen, carbon, and nitrogen at high temperature. Calcium is used as a reducing agent, a deoxidizing agent for metals, or a high vacuum getter (see Physical and Chemical Dictionary).

Lanthanum has been researched and developed as an electronic material, e.g., as a metal gate material or a high dielectric constant material (High-k), in recent years and is a metal that is paid attention to. Rare earths other than lanthanum have been researched and developed from similar viewpoints. In the following explanation, problems in use of lanthanum will be specifically described. Other rare earth elements have similar tendency.

Metal lanthanum is easily oxidized during purification. This disadvantageous property makes high purification difficult. Accordingly, there have been no high-purity products. In addition, since metal lanthanum is oxidized and discolored into black within a short time by being left in the air, the handling thereof is difficult.

Recently, gate-insulating films in the next-generation MOSFETs are required to reduce the thickness, but the reduction in thickness increases the leakage current due to a tunnel effect in SiO$_2$ used in gate-insulating films, resulting in a difficulty of normal operation.

Consequently, HfO$_2$, ZrO$_2$, Al$_2$O$_3$, and La$_2$O$_3$ having high dielectric constants, high thermal stabilities, and high energy barriers against the holes and electrons in silicon have been proposed, as alternatives for SiO$_2$. In particular, La$_2$O$_3$ which is highly valued among these materials, has been examined for its electrical properties, and has been reported as a gate-insulating film in the next-generation MOSFET (see Non-Patent Literature 1). In this Non-Patent Literature, however, the subject of research is a La$_2$O$_3$ film, and the properties and behavior of a La element are not reported.

As a method of purifying rare earth metals, a technology of reducing a halide of a rare earth metal using calcium or calcium hydride was proposed about 20 years ago. The examples of the rare earths therein include lanthanum, but the technology itself is merely using a slag separation jig as a means for separating slag, and the problems of metal lanthanum and any method of purification are almost not described (see Patent Literature 1).

As described above, the rare earth elements such as lanthanum are paid attention as valuable materials, but high-purity thereof is difficult to be achieved. However, in order to exploit the characteristics of rare earth elements such as lanthanum, it is preferable to reduce the amounts of impurities such as carbon (graphite), Al, Fe, and Cu. Alkali metals, alkaline earth metals, transition metal elements, high melting point metal elements, and radioactive elements affect the characteristics of semiconductors and are also required to be reduced in amounts.

In production of high-purity lanthanum, usually, a starting material of lanthanum fluoride having a purity, excluding the gas components, of 4N or more is reduced with high-purity calcium to prepare lanthanum having a purity of 4N or more, and this lanthanum prepared by reduction is subjected to electron beam melting to remove volatile substances. As a result, high-purity lanthanum having a purity, excluding the gas components, of 4N5 or higher is provided. Rare earth elements other than lanthanum can be highly purified by similar processes.

In such cases, however, it is necessary to reduce impurities by using highly purified calcium in the reduction process. Use of a calcium containing a large amount of impurities causes an increase in the amount of impurities contained in the rare earth elements.

As existing technologies, for example, the method disclosed in Patent Literature 2 includes pre-distillation (3 to 16 hours) at 630° C. to 700° C. to reduce the amount of Mg and main distillation (12 hours) at 900° C. to 920° C. to reduce the amounts of impurities to Mg: 60 ppm (0.006%), Al: 10 ppm (0.001%), Mn: 80 ppm (0.008%), Fe: 10 ppm (0.001%), and Zn<10 ppm (0.001%).

However, such a degree of purity of calcium is insufficient. Though the amount of Cu as an impurity is not defined (not described), since water-cooled Cu is necessarily used for handling calcium in a liquid form, a risk of containing a large amount of Cu as an impurity is high.

Patent Literature 3 discloses a method of producing metal calcium by charging a mixture of such as calcium oxide and aluminum into a retort and performing vacuum distillation, wherein a packed bed of calcium oxide grains is disposed between the mixture and a calcium vapor condenser. However, this method is a technology specialized in reduction of only aluminum in calcium as a reduced agent (Ca) for producing samarium, a refining agent for special steel, and any other impurities in calcium are not described. Thus, the method is not a comprehensive technology for high purification.

Patent Literature 4 discloses a technology for highly purifying Ca by capturing Mg through a temperature distribution formed in a retort by Al reduction of CaO. This technology is characterized by the structure of the retort that allows purification of calcium to purity of 99.9% or more by one reduction. The analytical values shown are those of Mg only. Thus, the technology is not a comprehensive technology for high purification.

As described above, in known technologies, there is no disclosure of technology effective for producing calcium that can achieve comprehensively high purification.

CITATION LIST

Patent Literature

Patent Literature 1: Japanese Patent Laid-Open No. S63-11628

Patent Literature 2: Japanese Patent Laid-Open No. S58-141349

Patent Literature 3: Japanese Patent Publication No. S63-47780

Patent Literature 4: Japanese Patent Laid-Open No. H07-76739

SUMMARY OF THE INVENTION

It is an object of the present invention to provide a technology that can stably provide high-purity calcium that can be used not only in production of high-purity lanthanum but also as a reducing agent for other rare earths, a desulfurizing or deoxidizing agent for metals, or a high-vacuum getter pump.

The present invention provides:
1) a method of producing high-purity calcium comprising: charging a calcium starting material having a purity, excluding the gas components, of 4N or less into a crucible of a sublimation vessel; performing first sublimation purification by heating at 750° C. to 800° C. so that calcium is sublimated and deposits (evaporates) onto the inner side wall of the sublimation vessel; recovering the calcium purified by the first sublimation purification; charging the recovered calcium into a crucible of a sublimation vessel again; performing second sublimation purification by heating at 750° C. to 800° C. so that calcium is sublimated and deposits (evaporates) onto the inner side wall of the sublimation vessel; and recovering the calcium having a purity of 4N5 or higher.

The present invention also provides:
2) the method of producing high-purity calcium according to 1), wherein calcium is sublimated at a sublimation rate of 0.25 to 0.75 g/cm$^2$/h.

The present invention also provides:
3) the method of producing high-purity calcium according to 1) or 2), wherein the sublimation vessel is kept at a degree of vacuum of $1 \times 10^{-4}$ Pa or more during the sublimation purification;
4) the method of producing high-purity calcium according to any one of 1) to 3), the method giving a yield of 80% or more based on the calcium starting material.

The present invention also provides:
5) the method of producing high-purity calcium according to any one of 1) to 4), wherein the recovered high-purity calcium contains less than 5 ppm of each transition metal element;
6) the method of producing high-purity calcium according to any one of 1) to 4), wherein the recovered high-purity calcium contains less than 1 ppm of each transition metal element.

The present invention also provides:
7) high-purity calcium having a purity of 4N5 or higher;
8) the high-purity calcium according to 7), containing less than 5 ppm of each transition metal element; and
9) the high-purity calcium according to 7), containing less than 1 ppm of each transition metal element.

The high-purity calcium described above is a novel material and is encompassed in the present invention. Such high-purity calcium can be effectively used in calcium reduction for purifying rare earth elements, such as metal lanthanum, having high purities. Thus, the high-purity calcium can be used as a reducing agent for rare earth elements, a desulfurizing or deoxidizing agent for metals, or a high-vacuum getter pump.

The present invention relates to recovering calcium having a purity of 4N5 or higher by performing sublimation purification twice and has an excellent effect of stably providing highly purified calcium.

BRIEF DESCRIPTION OF THE DRAWING

FIG. 1 is a schematic explanatory diagram of a sublimation apparatus.

DETAILED DESCRIPTION

In the method of producing high-purity calcium of the present invention, a starting material of calcium having a purity, excluding the gas components, of 4N or less is charged into a crucible of a sublimation vessel. Subsequently, first sublimation purification is performed by heating the starting material at 750° C. to 800° C. and thereby allowing the sublimated calcium to deposit (evaporate) onto the inner side wall of the sublimation vessel. The calcium purified by the first sublimation purification is cooled and is then recovered.

Subsequently, the recovered calcium is charged into a crucible of a sublimation vessel again. The sublimation vessel may be different from or the same as that used in the first sublimation purification. Second sublimation purification is performed by heating the recovered calcium at 750° C. to 800° C. again and thereby allowing calcium to deposit (evaporate) onto the inner side wall of the sublimation vessel. As a result, calcium having a purity of 4N5 or higher can be recovered.

The temperature for sublimation, 750° C. to 800° C., is a temperature slightly lower than the melting point, 839° C., and is controlled for adjusting the sublimation rate of calcium. A temperature lower than 750° C. decreases the efficiency of sublimation purification, whereas a temperature exceeding 800° C. causes contamination of impurities. Accordingly, the temperature is adjusted within the above-mentioned range. As a result, the sublimation rate of calcium can be controlled to be 0.25 to 0.75 g/cm$^2$/h. This rate is suitable for sublimation purification of calcium.

The sublimation vessel used is usually made of thermostable stainless steel. Calcium which is purified by sublimation purification and deposits (evaporates) to this sublimation vessel is recovered.

The degree of vacuum in the sublimation vessel during the sublimation purification is kept to be high, i.e., $1 \times 10^{-4}$ Pa or more, to accelerate the sublimation and remove highly vaporizable impurities contained in calcium.

The process of the present invention can achieve a yield of 80% or more based on the calcium starting material. In addition, the content of each transition metal element in the recovered high-purity calcium can be reduced to less than 5 ppm and further to less than 1 ppm.

Thus, high-purity calcium having a purity of 4N5 or higher can be provided. In addition, the content of each transition metal element in this high-purity calcium can be reduced to less than 5 ppm and further to less than 1 ppm.

EXAMPLES

Examples will now be described. The examples are intended to facilitate understanding and do no limit the present invention. That is, other examples and modifications within the technical idea of the present invention are encompassed in the present invention.

Example 1

Calcium starting material (3.5 kg) having a purity of 99.9% (3N) containing impurities shown in Table 1 was charged in a crucible at the bottom of a vertical sublimation vessel shown in FIG. 1. Table 1 also shows variation in the starting material. The degree of vacuum in the sublimation vessel was in an order of magnitude of $1\times10^{-4}$ Pa. The vacuum processing was achieved by rough pumping with a rotary pump and fine pumping with a cryopump. The heating of the crucible was controlled within the following range.

TABLE 1

| | Variation in raw material | | Ca analytica value (Example) | | | | |
| | Min | Max | Raw material | First sublimation | Residue in first sublimation | Second sublimation | |
|---|---|---|---|---|---|---|---|
| Weight | | | 3.5 kg | 3.0 kg | 0.25 kg | 2.8 kg | |
| Li | 0.17 Te 5.4 | | 0.35 | 0.15 | <0.05 | <0.05 | Li |
| Be | <0.05 | | <0.05 | <0.05 | <0.05 | <0.05 | Be |
| B | 0.05~0.06 | | <0.05 | <0.05 | <0.05 | <0.05 | B |
| F | 1~4 | | <1 | <1 | <1 | <1 | F |
| Na | 0.76~97 | | 0.33 | 0.51 | <0.05 | <0.05 | Na |
| Mg | 4.5~240 | | 52 | 7.9 | <0.05 | <0.05 | Mg |
| Al | <0.05~90 | | 14 | 5.8 | 110 | <0.05 | Al |
| Si | 0.06~140 | | 15 | 6.4 | 135 | <0.05 | Si |
| P | <0.05~0.06 | | <0.05 | <0.05 | <0.05 | <0.05 | P |
| S | 0.19~3.1 | | 0.21 | 2 | 1 | <0.05 | S |
| Cl | 40~2400 | | ~2100 | ~160 | ~30 | ~50 | Cl |
| K | 0.5~2.5 | | <0.5 | 1.1 | <0.5 | <0.5 | K |
| Ca | | | | | | | Ca |
| Sc | <0.01 | | <0.01 | <0.01 | <0.01 | <0.01 | Sc |
| Ti | <0.05~5.3 | | 0.57 | 0.58 | 1.4 | <0.05 | Ti |
| V | <0.01~0.09 | | 0.09 | <0.01 | 0.07 | <0.01 | V |
| Cr | <0.05~0.8 | | 0.56 | 0.36 | 0.6 | <0.05 | Cr |
| Mn | 7.1~42 | | 26 | 0.48 | 0.77 | 0.09 | Mn |
| Fe | 1.4~75 | | 5 | 1.3 | 64 | <0.05 | Fe |
| Co | <0.05~0.52 | | <0.05 | <0.05 | <0.05 | <0.05 | Co |
| Ni | <0.1~1.1 | | <0.1 | <0.1 | <0.1 | <0.1 | Ni |
| Cu | 30~650 | | 95 | 4.6 | 380 | <2 | Cu |
| Zn | <0.1~2.4 | | <0.1 | <0.1 | <0.1 | <0.1 | Zn |
| Ga | <0.05 | | <0.05 | <0.05 | <0.05 | <0.05 | Ga |
| Ge | <0.5 | | <0.5 | <0.5 | <0.5 | <0.5 | Ge |
| As | =<50 | | =<50 | =<50 | =<50 | =<50 | As |
| Se | =<10~100 | | =<10 | =<10 | =<10 | =<10 | Se |
| Br | <0.5 | | <0.5 | <0.5 | <0.5 | <0.5 | Br |
| Rb | <0.05 | | <0.05 | <0.05 | <0.05 | <0.05 | Rb |
| Sr | =<160~3500 | | =<47 | =<830 | =<420 | =<230 | Sr |
| Y | <0.1 | | <0.1 | <0.1 | <0.1 | <0.1 | Y |
| Zr | <0.05 | | <0.05 | <0.05 | <0.05 | <0.05 | Zr |
| Nb | <0.1 | | <0.1 | <0.1 | <0.1 | <0.1 | Nb |
| Mo | <0.5 | | <0.5 | <0.5 | <0.5 | <0.5 | Mo |
| Ru | <1 | | <1 | <1 | <1 | <1 | Ru |
| Rh | <0.1 | | <0.1 | <0.1 | <0.1 | <0.1 | Rh |
| Pd | <0.5 | | <0.5 | <0.5 | <0.5 | <0.5 | Pd |
| Ag | <0.5 | | <0.5 | <0.5 | <0.5 | <0.5 | Ag |
| Cd | <5 | | <5 | <5 | <5 | <5 | Cd |
| In | <0.5 | | <0.5 | <0.5 | <0.5 | <0.5 | In |
| Sn | <0.5 | | <0.5 | <0.5 | <0.5 | <0.5 | Sn |
| Sb | <0.1 | | <0.1 | <0.1 | <0.1 | <0.1 | Sb |
| Te | <0.5 | | <0.5 | <0.5 | <0.5 | <0.5 | Te |
| I | <1 | | <1 | <1 | <1 | <1 | I |
| Cs | <0.5 | | <0.5 | <0.5 | <0.5 | <0.5 | Cs |
| Ba | 2.3~110 | | 8.5 | 17 | 33 | 22 | Ba |
| La | <0.05 | | <0.05 | <0.05 | <0.05 | <0.05 | La |
| Ce | <0.05 | | <0.05 | <0.05 | <0.05 | <0.05 | Ce |
| Pr | <0.05 | | <0.05 | <0.05 | <0.05 | <0.05 | Pr |
| Nd | <0.05 | | <0.05 | <0.05 | <0.05 | <0.05 | Nd |
| Sm | <0.05 | | <0.05 | <0.05 | <0.05 | <0.05 | Sm |
| Eu | <0.05 | | <0.05 | <0.05 | <0.05 | <0.05 | Eu |
| Gd | <0.05 | | <0.05 | <0.05 | <0.05 | <0.05 | Gd |
| Tb | <0.05 | | <0.05 | <0.05 | <0.05 | <0.05 | Tb |
| Dy | <0.05 | | <0.05 | <0.05 | <0.05 | <0.05 | Dy |
| Ho | <0.05 | | <0.05 | <0.05 | <0.05 | <0.05 | Ho |
| Er | <0.05 | | <0.05 | <0.05 | <0.05 | <0.05 | Er |
| Tm | <0.05 | | <0.05 | <0.05 | <0.05 | <0.05 | Tm |
| Yb | <0.05 | | <0.05 | <0.05 | <0.05 | <0.05 | Yb |
| Lu | <0.05 | | <0.05 | <0.05 | <0.05 | <0.05 | Lu |
| Hf | <0.05 | | <0.05 | <0.05 | <0.05 | <0.05 | Hf |
| Ta | | | <5 | <5 | <5 | <5 | Ta |
| W | <0.1 | | <0.1 | <0.1 | <0.1 | <0.1 | W |
| Re | <0.05 | | <0.05 | <0.05 | <0.05 | <0.05 | Re |
| Os | <0.05 | | <0.05 | <0.05 | <0.05 | <0.05 | Os |
| Ir | <0.05 | | <0.05 | <0.05 | <0.05 | <0.05 | Ir |
| Pt | <0.05 | | <0.05 | <0.05 | <0.05 | <0.05 | Pt |
| Au | <1 | | <1 | <1 | <1 | <1 | Au |
| Hg | <0.1 | | <0.1 | <0.1 | <0.1 | <0.1 | Hg |
| Tl | <0.05 | | <0.05 | <0.05 | <0.05 | <0.05 | Tl |

TABLE 1-continued

|  | Variation in raw material Min | Variation in raw material Max | Raw material | Ca analytical value (Example) First sublimation | Ca analytical value (Example) Residue in first sublimation | Second sublimation |  |
|---|---|---|---|---|---|---|---|
| Pb | <0.05~1.1 |  | <0.05 | 1.9 | 3.8 | <0.05 | Pb |
| Bi | <0.05 |  | <0.05 | <0.05 | <0.05 | <0.05 | Bi |
| Th | <0.005 |  | <0.005 | <0.005 | <0.005 | <0.005 | Th |
| U | <0.005 |  | <0.005 | <0.005 | <0.005 | <0.005 | U |
| C | 35~150 |  | 48 | 55 | 100 | 40 | C |
| N | <10~120 |  | 13 | <10 | <10 | <10 | N |
| O | 100~1200 |  | 120 | 80 | 2000 | 100 | O |
| S | <10 |  | <10 | <10 | <10 | <10 | S |
| H | 23~48 |  | 23 | 30 | 50 | 30 | H |

The heating temperature was 770° C. in a steady state and was normally controlled within a range of 750° C. to 800° C. The sublimation rate was 0.64 g/cm²/h in a steady state and was normally controlled within a range of 0.25 to 0.75 g/cm²/h. A sublimation rate lower than this range increases the variation in sublimation rate and causes to decrease the efficiency; on the other hand, a sublimation rate higher than this range is apt to give a low purity.

As described above, 3.5 kg of the calcium starting material was used. The first sublimation gave 3.0 kg of an adhered (deposited) product onto the inner side wall of the sublimation vessel. This analytical value is also shown in Table 1.

The residue of the first sublimation was 0.25 kg, and the loss was 0.25 kg. The analytical values of the residue in the first sublimation are also shown in Table 1. The values were Mg<0.05 wt ppm, Fe: 64 wt ppm, and Cu: 380 wt ppm. The amount of the residual copper was high. In the first sublimation, the starting material shape was prone to be unstable, and the sublimation rate was also prone to be unstable.

Subsequently, the calcium starting material (3.0 kg) deposited in the first sublimation was charged in a crucible at the bottom of a vertical sublimation vessel shown in FIG. 1. As a result, 2.8 kg of calcium was recovered. Accordingly, the yield was 80%, obtained by 2.8/3.5=80.

The amounts of impurities in calcium after the second sublimation are also shown in Table 1. As obvious from the amounts of impurities shown in Table 1, high-purity calcium was provided.

As shown in Table 1, it is demonstrated that since the amount of Cu present in calcium as starting material largely varies, sublimation purification is required to be performed twice. The amounts of Sr and Ba are relatively high as analytical values of calcium. However, since the properties of these elements are similar to those of calcium, these elements do not substantially cause any problem in use of calcium as a reducing agent.

The conditions for the first and second sublimation were the same.

Comparative Example 1

The same calcium starting material as that in Example 1 was sublimated only once at 750° C. at a sublimation rate of 0.50 g/cm²/h to obtain a deposited product on the inner side wall of the sublimation vessel.

Other conditions were the same as those in Example 1. As a result, as shown in the analytical results shown in Table 2, the amounts of impurities were generally greater than those in Example 1; the amounts of Fe and Cu were apparently large, and thus the object of the present invention could not be achieved.

TABLE 2

Sublimation rate (g/cm²/h) 0.50
Temperature (° C.) 750
First sublimation

| Li | <0.05 | Sn | <0.5 |
|---|---|---|---|
| Be | <0.05 | Sb | <0.1 |
| B | 0.07 | Te | <0.5 |
| F | <1 | I | <1 |
| Na | 0.31 | Cs | <0.5 |
| Mg | 8 | Ba | 38 |
| Al | 1.1 | La | <0.05 |
| Si | 1.6 | Ce | <0.05 |
| P | <0.05 | Pr | <0.05 |
| S | 1.5 | Nd | <0.05 |
| Cl | ~550 | Sm | <0.05 |
| K | <0.5 | Eu | <0.05 |
| Ca |  | Gd | <0.05 |
| Sc | <0.01 | Tb | <0.05 |
| Ti | 0.55 | Dy | <0.05 |
| V | <0.01 | Ho | <0.05 |
| Cr | 0.22 | Er | <0.05 |
| Mn | 0.95 | Tm | <0.05 |
| Fe | 4.1 | Yb | <0.05 |
| Co | <0.05 | Lu | <0.05 |
| Ni | <0.1 | Hf | <0.05 |
| Cu | 17 | Ta | <5 |
| Zn | <0.1 | W | <0.1 |
| Ga | <0.05 | Re | <0.05 |
| Ge | <0.5 | Os | <0.05 |
| As | =<140 | Ir | <0.05 |
| Se | =<110 | Pt | <0.05 |
| Br | <0.5 | Au | <1 |
| Rb | <0.05 | Hg | <0.1 |
| Sr | =<1200 | Tl | <0.05 |
| Y | <0.1 | Pb | 0.8 |
| Zr | <0.05 | Bi | <0.05 |
| Nb | <0.1 | Th | <0.005 |
| Mo | <0.5 | U | <0.005 |
| Ru | <1 | C | 90 |
| Rh | <0.1 | N | <10 |
| Pd | <0.5 | O | 300 |
| Ag | <0.5 | S | <10 |
| Cd | <5 | H | 15 |
| In | <0.5 |  |  |

Comparative Example 2

The same calcium starting material as that in Example 1 was sublimated once at 850° C. at a sublimation rate (evaporation rate) of 4.0 g/cm²/h to obtain a deposited product on the inner side wall of the sublimation vessel. Other conditions were the same as those in Example 1. As a result, as shown in the analytical results in the left side of Table 3, the amounts of impurities were generally greater than those in Example 1; the amounts of Si, Ti, Mn, Fe, Cu, As, Sr, and Ba were apparently large, and thus the object of the present invention could not be achieved.

TABLE 3

| Sublimation rate (g/cm²/h) 4.0 Temperature (° C.) 850 First sublimation | | | | Sublimation rate (g/cm²/h) 4.0 Temperature (° C.) 850 Second sublimation | | | |
|---|---|---|---|---|---|---|---|
| Li | <0.05 | Sn | <0.5 | Li | <0.05 | Sn | <0.5 |
| Be | <0.05 | Sb | <0.1 | Be | <0.05 | Sb | <0.1 |
| B | <0.05 | Te | <0.5 | B | 0.45 | Te | <0.5 |
| F | 2.1 | I | <1 | F | <1 | I | <1 |
| Na | <0.2 | Cs | <0.5 | Na | 0.21 | Cs | <0.5 |
| Mg | 1.7 | Ba | 43 | Mg | 2.9 | Ba | 29 |
| Al | 0.82 | La | <0.05 | Al | 0.13 | La | <0.05 |
| Si | 4.2 | Ce | <0.05 | Si | 0.37 | Ce | <0.05 |
| P | <0.05 | Pr | <0.05 | P | <0.05 | Pr | <0.05 |
| S | 2.8 | Nd | <0.05 | S | 0.42 | Nd | <0.05 |
| Cl | ~3600 | Sm | <0.05 | Cl | ~740 | Sm | <0.05 |
| K | <0.5 | Eu | <0.05 | K | <0.5 | Eu | <0.05 |
| Ca | | Gd | <0.05 | Ca | | Gd | <0.05 |
| Sc | <0.01 | Tb | <0.05 | Sc | <0.01 | Tb | <0.05 |
| Ti | 6.8 | Dy | <0.05 | Ti | <0.05 | Dy | <0.05 |
| V | <0.01 | Ho | <0.05 | V | <0.01 | Ho | <0.05 |
| Cr | 0.13 | Er | <0.05 | Cr | <0.05 | Er | <0.05 |
| Mn | 3 | Tm | <0.05 | Mn | 0.41 | Tm | <0.05 |
| Fe | 6.7 | Yb | <0.05 | Fe | 0.16 | Yb | <0.05 |
| Co | <0.05 | Lu | <0.05 | Co | <0.05 | Lu | <0.05 |
| Ni | 0.32 | Hf | <0.05 | Ni | <0.1 | Hf | <0.05 |
| Cu | 150 | Ta | <5 | Cu | 5.1 | Ta | <5 |
| Zn | <0.1 | W | <0.1 | Zn | <0.1 | W | <0.1 |
| Ga | <0.05 | Re | <0.05 | Ga | <0.05 | Re | <0.05 |
| Ge | <0.5 | Os | <0.05 | Ge | <0.5 | Os | <0.05 |
| As | =<110 | Ir | <0.05 | As | =<20 | Ir | <0.05 |
| Se | =<90 | Pt | <0.05 | Se | =<100 | Pt | <0.05 |
| Br | <0.5 | Au | <1 | Br | <0.5 | Au | <1 |
| Rb | <0.05 | Hg | <0.1 | Rb | <0.05 | Hg | <0.1 |
| Sr | =<670 | Tl | <0.05 | Sr | =<560 | Tl | <0.05 |
| Y | <0.1 | Pb | 3.1 | Y | <0.1 | Pb | 3.9 |
| Zr | <0.05 | Bi | 0.14 | Zr | <0.05 | Bi | 0.15 |
| Nb | <0.1 | Th | <0.005 | Nb | <0.1 | Th | <0.005 |
| Mo | <0.5 | U | <0.005 | Mo | <0.5 | U | <0.005 |
| Ru | <1 | C | 100 | Ru | <1 | C | 120 |
| Rh | <0.1 | N | <10 | Rh | 0.1 | N | <10 |
| Pd | <0.5 | O | 230 | Pd | <0.5 | O | 130 |
| Ag | <0.5 | S | <10 | Ag | <0.5 | S | <10 |
| Cd | <5 | H | 35 | Cd | <5 | H | 210 |
| In | <0.5 | | | In | <0.5 | | |

Comparative Example 3

The same calcium starting material as that in Example 1 was sublimated twice at a first heating temperature of 850° C. at a sublimation rate (evaporation rate) of 4.0 g/cm²/h and then at a second heating temperature of 850° C. at a sublimation rate (evaporation rate) of 3.7 g/cm²/h to obtain a deposited product on the inner side wall of the sublimation vessel. Other conditions were the same as those in Example 1. As a result, as shown in the analytical results in the right of Table 3, the amounts of impurities were generally greater than those in Example 1; the amounts of Mg, Al, Si, Fe, Cu, and Pb were apparently large, and thus the object of the present invention could not be achieved.

The present invention relates to recovery of calcium having a purity of 4N5 or higher by performing sublimation purification twice and has an excellent effect of stably providing highly purified calcium. The purified calcium can be used not only in production of high-purity lanthanum but also as a reducing agent for other rare earths, a desulfurizing or deoxidizing agent for metals, or a getter for high-vacuum pumps.

The invention claimed is:

1. A method of producing high-purity calcium comprising:
    charging calcium starting material having a purity, excluding the gas components, of 4N or less into a crucible of a sublimation vessel;
    performing first sublimation purification by heating at 750° C. to 800° C. so that calcium is sublimated and deposits (evaporates) onto the inner side wall of the sublimation vessel;
    recovering the calcium purified by the first sublimation purification;
    charging the calcium into a crucible of a sublimation vessel again;
    performing second sublimation purification by heating at 750° C. to 800° C. so that the calcium is sublimated and deposits (evaporates) onto the inner side wall of the sublimation vessel; and
    recovering the calcium having a purity of 4N5 or higher.

2. The method of producing high-purity calcium according to claim 1, wherein calcium is sublimated at a sublimation rate of 0.25 to 0.75 g/cm²/h.

3. The method of producing high-purity calcium according to claim 2, wherein the sublimation vessel is kept at a vacuum of an air pressure being equal to or less than $1 \times 10^{-4}$ Pa during the sublimation purification.

4. The method of producing high-purity calcium according to claim 3, wherein the yield of the calcium starting material is 80% or more.

5. The method of producing high-purity calcium according to claim 4, wherein the recovered high-purity calcium contains less than 5 ppm of each transition metal element.

6. The method of producing high-purity calcium according claim 4, wherein the recovered high-purity calcium contains less than 1 ppm of each transition metal element.

7. The method of producing high-purity calcium according to claim 1, wherein the sublimation vessel is kept at a vacuum of an air pressure being equal to or less than $1 \times 10^{-4}$ Pa during the sublimation purification.

8. The method of producing high-purity calcium according to claim 1, wherein yield of the calcium starting material is 80% or more.

9. The method of producing high-purity calcium according to claim 1, wherein the recovered high-purity calcium contains less than 5 ppm of each transition metal element.

10. The method of producing high-purity calcium according claim 1, wherein the recovered high-purity calcium contains less than 1 ppm of each transition metal element.

* * * * *